3,520,324
VALVE OPERATING SIMULTANEOUSLY AS
INTERCEPTING, REGISTER AND CHECK
VALVE FOR FLUID FLOWS
Santina Meregalli, Via Savanarola 21,
Monza, Milano, Italy
Filed Oct. 7, 1966, Ser. No. 585,148
Claims priority, application Italy, Oct. 12, 1965,
9,995/65
Int. Cl. F16k *31/53, 51/00*
U.S. Cl. 137—219       4 Claims

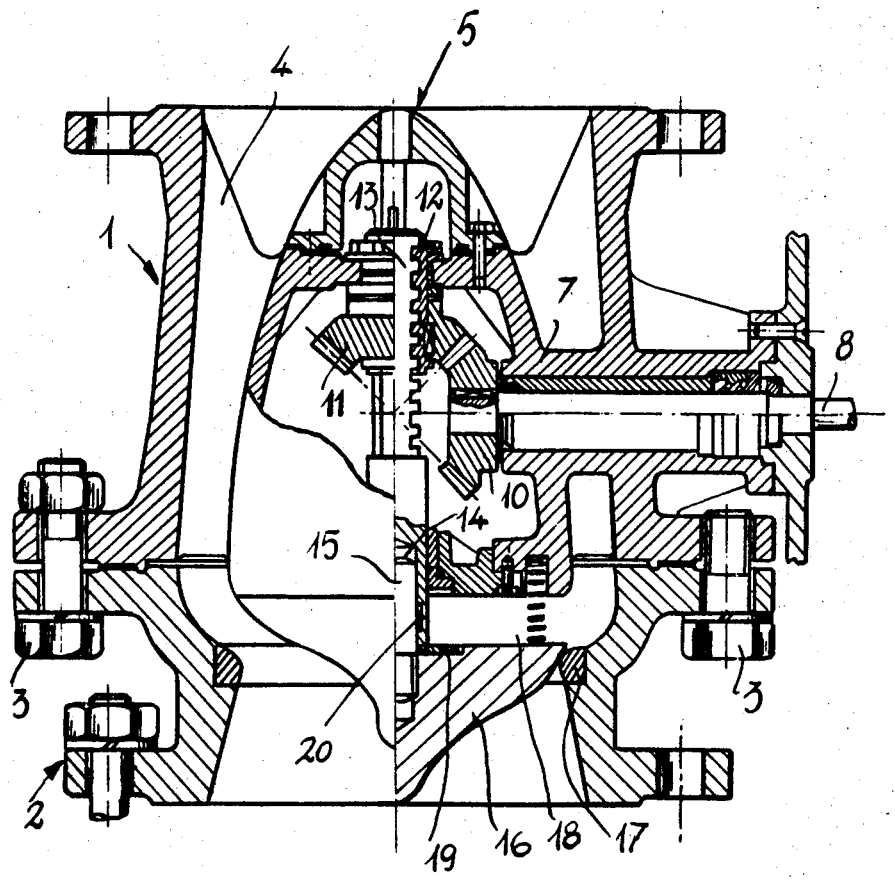

ABSTRACT OF THE DISCLOSURE

A valve which can be positioned to function in a number of different ways. Thus, a valve member of the valve can be held in a closed position against a valve seat by a non-yielding structure which will prevent movement of the valve from the valve seat until the non-yielding structure is displaced away from the valve member, so that in this way the structure acts as a conventional gate valve. However, it is also possible to maintain the valve against the valve seat only with a yieldable spring structure, so that the valve can function as a non-return valve providing for a one-way flow of fluid. Finally, it is also possible to position the valve member in such a way that it does not reach up to the valve seat but instead forms a predetermined gap therewith, in an end position of the valve, so that in this way the valve functions as a throttle to provide a predetermined throttle to the flow of the fluid.

---

The present invention relates to a valve particularly designed as to shape and arrangement so as to shown excellent operative features, suitable to operate simultaneously as a gate valve and a check valve, and as a limiting member for the effects due to water hammerings.

According to a first aspect of the invention, the valve is provided with a slide valve body free to move independently of the members determining the closing thereof when the gate valve is at an open position.

According to another aspect of the invention, the members for opening and closing the gate valve are enclosed within a sealed body not contacting the liquid passing through the valve.

According to another aspect, the invention provides means suitable to limit the water hammering effects on the slide valve member.

The present invention will be better understood from the following detailed description given by way of mere indication and therefore of not restriction, particularly referring to the annexed drawing showing in a sectional view a valve according to the invention with some exposed portions of the central body.

A valve according to the invention is substantially comprised of two separate portions, indicated as a whole at 1 and 2, interconnected by flanges and bolts 3, suitable seals being interposed therebetween.

Body or valve housing 1 is hollow and, suitably supported by fins or tabs 4, carries an ogival central body, indicated as a whole at 5, enclosing the assembly of the control members for closing and opening the gate valve; body 5 is connected to body 1 also by a radial sleeve 7 internally of which is the control shaft 8 which passes through sleeve 7. Shaft 8 may be manually controlled outside of body 1 by a handwheel, hand lever or any known servo control device.

Inside of body 5 and on shaft 8 a bevel gear 10 is keyed, said bevel gear meshing with a second bevel gear 11 keyed on a bush 12, which is internally threaded and secured to body 5 by suitable means, such as angle means, so that the same may freely rotate without undergoing any axial shift.

Inside of bush 12 a threaded pin or elongated shaft 13 is screwed, said pin being provided with an axial hole 14, having a closed inner end and in which a pin 15 rigidly connected to a suitably shaped valve body 16 operating as a slide valve body may axially slide. Body 16 has edges of a contour complementary to that of a seating 17 provided on element 2 at a narrowing of the angular chamber surrounding the ogival central body 5. Between body 16 and body 1 there is provided a helical spring 18 permanently pressing body 16 toward and against seating 17. It is to be noted that an end edge of pin 13 is preferably caused to operate on a rim 19 rigidly connected to body 16, said rim being made of a material harder than body 16. According to a special aspect, it is to be noted that between said pin 13 and rim 19 rigidly connected to pan 16 no friction will occur in opposition to the usual cases.

Operation of the valve according to the invention may be summarized as follows: by rotating shaft 8 in either direction, through rotation of gears 10, 11 within a bush 12, the raising or lowering, respectively, of pin 13 is caused, which pin will correspondingly determine the closing, choking and full opening positions of the slide valve body 16 and hence of the gate; a spring system 18 biases the slide valve body 16 against seating 17 and, therefore, it is the water pressure on the upstream valve inlet to cause the opening of body 16 in opposition to springs 18, while automatically a back pressure downstream of slide valve 16 together with the action of springs 18 will cause the slide valve body to be closed. Thus, the device according to the invention effects the threefold function of interception (similar to a gate valve at a close position), register or throttle (similar to a spindle valve at a partial opening position), and check valve at any position.

In addition, by providing for instance a groove 20 of some height on the inner face of the bore of pin 13 and, correspondingly, a lug on the outer face of pin 15, so as to define the relative axial stroke between pin 15 and pin 13, the gate valve may be adjusted in such manner that the effects of possible downstream water hammerings are minimized, avoiding the sharp and full closing of the slide valve body against seating 17; actually, through the lug received within seating 20, a small stop port or gap may be left, subduing the well known effects due to water hammering. It is to be noted that the conduit shape defined between the valve body and ogive 5, as well as at slide valve 16, is particularly functional and suitable to reduce the losses of pressure to a minimum. As previously stated, this valve has the important advantage of providing a closed body 5 containing all the operating members: it is thus possible to to introduce oil or grease into said body, which will provide an excellent long-lasting operation without any need for frequent servicing.

Although only one embodiment of the invention has been described; now it will be easy for those skilled in the art to provide numerous changes and modifications, all of which are to be deemed as within the scope of the present invention.

What is claimed is:
1. In a valve, a valve housing having a valve seat, a valve body situated in said housing for movement into and out of engagement with said seat, non-yielding holding means coacting with said body for maintaining the latter in a non-yielding manner against said seat so that said body is held in a closed position in the manner of a gate valve, transmission means coacting with said non-yielding means for displacing the latter away from said body to release the latter for movement to an open posi- tion, and spring means coacting with said body for yieldably holding latter against said seat, so that when said non-yielding means is displaced away from said body, said yieldable spring means coacts with said body to provide for the latter the function of a non-return valve, and an interior enclosure situated within said housing and enclosing said transmission means in a fluid-tight manner.

2. The combination of claim 1 and wherein as said non-yielding means includes an elongated shaft having an end engaging said body when maintaining the latter in a closed position against said seat, said shaft being formed with an axial bore extending inwardly along said shaft from said end thereof which engages said body to hold the latter in said closed position, and a pin fixed to said body and slidably received in said bore of said shaft.

3. The combination of 2 and wherein said bore has an inner end distant from said end of said shaft, and said shaft being formed between said inner end of said bore and said end which engages said body in the closed position of the latter with an axially extending groove communicating with the interior of said bore, said pin fixedly carrying a lug situated within and axially movable along said groove between opposed ends of the latter, so that said lug and groove coact to limit the extent of axial movement of said valve body with respect to said shaft, whereby the latter can be situated by said transmission means at a position preventing said body from being displaced by said spring means into engagement with said seat as a result of engagement of said lug with the end of said groove which is directed toward said body, whereby in this latter position a predetermined gap remains between said body and seat to enable the valve to function as a throttle.

4. The combination of claim 1 and wherein said inner enclosure has a substantially ogive shape coacting with the configuration of the inner surface of said housing to reduce pressure losses to a minimum.

References Cited

UNITED STATES PATENTS

| 2,266,485 | 12/1941 | Williams | 137—219 |
|---|---|---|---|
| 3,102,550 | 9/1963 | Shand et al. | 137—219 |
| 3,292,895 | 12/1966 | Leger et al. | 251—83 |

FOREIGN PATENTS 1,040,330   10/1958   German.

HENRY T. KLINKSIEK, Primary Examiner

U.S. Cl. X.R.

251—83